UNITED STATES PATENT OFFICE.

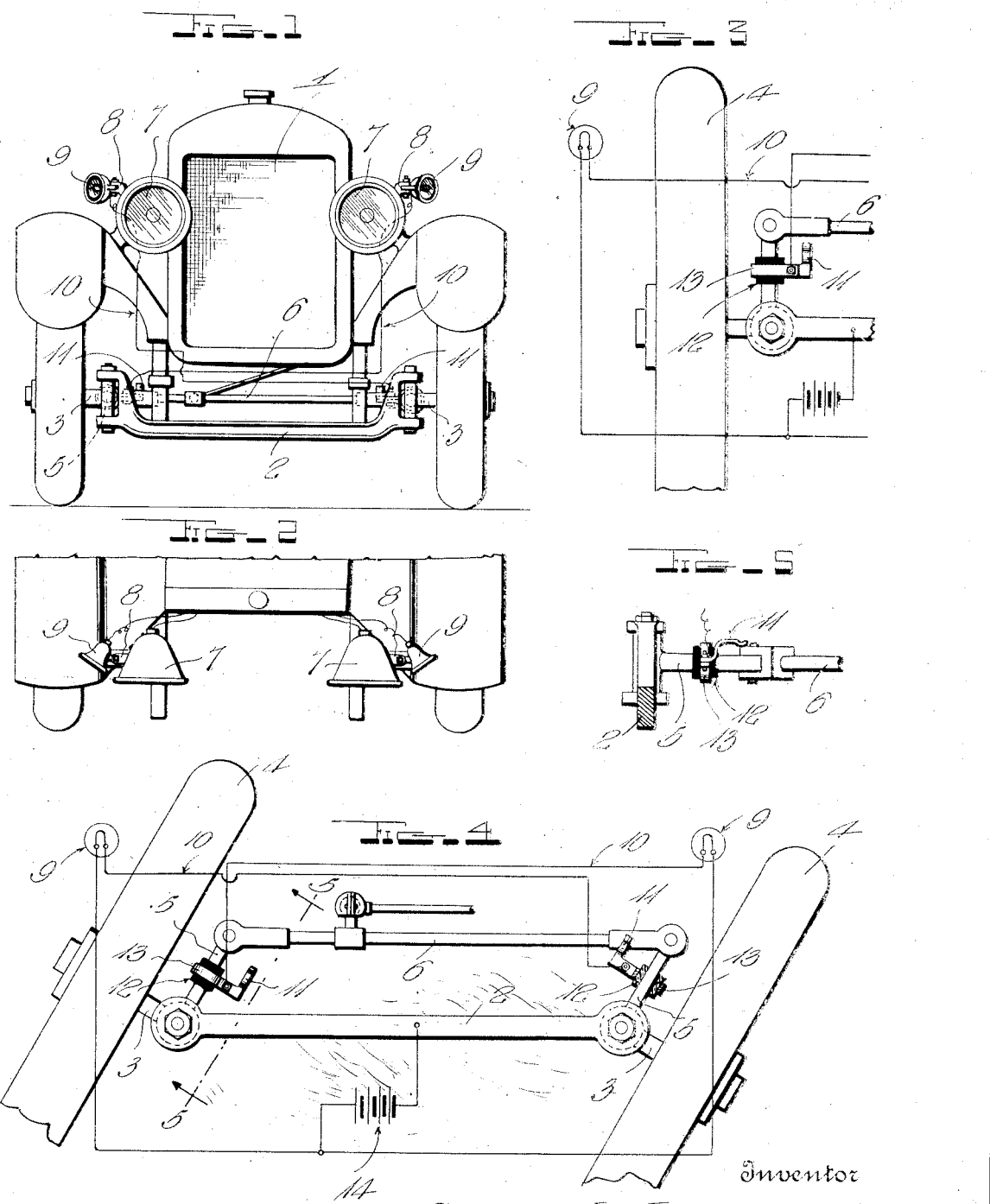

GERALD H. HARVEY, OF BOISE, IDAHO.

VEHICLE-LIGHTING DEVICE.

1,359,804.

Specification of Letters Patent.　　Patented Nov. 23, 1920.

Application filed January 15, 1920.　Serial No. 351,530.

*To all whom it may concern:*

Be it known that I, GERALD H. HARVEY, a citizen of the United States, residing at Boise, in the county of Ada and State of Idaho, have invented certain new and useful Improvements in Vehicle-Lighting Devices; and I do declare the following to be a full, clear, and exact description of the invention, such as will enable others skilled in the art to which it appertains to make and use the same.

This invention relates to lighting devices for motor vehicles and the like.

The principal object of the invention is to provide a device of the above type which is such that it will enable the driver of a vehicle to see the road either while traveling in a straight path or while turning around curves.

Another object of the invention is to provide a device of this character which can be readily and easily applied to vehicles without first especially adapting such vehicles for the attachment of the device.

An additional object of the invention is to generally improve upon devices of this class by the provision of a comparatively simple, strong, durable and inexpensive construction, one which will be efficient and reliable in operation, and well adapted to the purpose for which it is designed.

With these and other objects in view, the invention consists of the novel features of construction, and the combination and arrangement of parts as will be hereinafter fully described and claimed.

In the accompanying drawing in which similar reference characters designate like parts throughout the several views:

Figure 1 is a front view of a conventional automobile, showing a device constructed in accordance with this invention applied thereto.

Fig. 2 is a top plan view of a portion of the forward end of the automobile.

Fig. 3 is an enlarged horizontal sectional view taken across the forward part of the automobile looking down upon one end of the front axle thereof and illustrating particularly the spring contact which is carried by the arm of the steering knuckle, the parts being in the position they assume when the vehicle is traveling straight ahead.

Fig. 4 is a similar view of the complete front axle and parts associated therewith, showing them in the position they assume when the vehicle is turning, and Fig. 5 is a detail sectional view taken on the line 5—5 of Fig. 4.

Referring more particularly to the drawings, the numeral 1 designates an automobile which is merely conventionally shown, said automobile being provided with the usual well known parts viz., front axle 2, stub axles or spindles 3 which carry the front wheels 4 and also carry the rearwardly extending spindle arms 5, and a coupling or steering rod 6 having connection with the steering post (not shown) so as to be moved to the right or left by the latter to effect a turning of the automobile.

The automobile is provided with a pair of forwardly directed headlights 7, which when illuminated will direct the light directly in front of the machine. Fixed upon brackets 8 formed on the headlights 7, are auxiliary electric headlights 9, the latter being directed angularly longitudinally of the automobile and facing in opposite directions so that they are diverging. The headlight 9 on the right of the machine points in a right forward direction, while the headlight 9 on the left of the machine points in a left forward direction. One of the terminals of the headlights 9 are grounded to the metal frame of the automobile while the other terminals are connected by conductors 10 to spring contacts 11 which are mounted upon insulating sleeves 12 carried by the arms 5 of the steering knuckles. The light 9 on the right of the machine is connected to the contact 11 on the left of the machine, and the light 9 on the left of the machine is connected to the contact 11 on the right of the machine. The contacts are preferably, but not necessarily, formed integrally with clamps 13 which are fitted on the insulating sleeves 12.

When the automobile is running straight ahead the contacts will be free from engagement with anything, but when the machine is turning one of the contacts will engage the rod 6 and the circuit through the headlight 9 connected to this contact will be completed, the current passing through the conductor 10, contact 11, rod 6 and framework of the machine. The source of current may be in the form of a battery 14.

When the machine turns to the right, the contact 11 on the left side will engage the rod 6 so that the headlight 9 on the right side will be illuminated and its rays will be directed in the direction in which the vehicle is turning. The reverse is true when the machine is turning to the left. When the machine is running straight ahead the contacts will not engage the rod 6 so that neither one of the headlights 9 will be illuminated, but the road in front of the machine will be lighted by means of the main headlights 7.

From the foregoing description, taken in connection with the accompanying drawing, the construction, use and operation of the invention will be readily understood. It will be seen that the device may be readily and easily applied to vehicles without first especially adapting such vehicles for attachment of the various devices thereto.

Various changes in form, proportion, and in the minor details of construction may be resorted to without departing from the spirit of the invention as defined in the claim.

What is claimed is:

In a lighting device for automobiles, the combination with the usual steering knuckle arms and rod connecting said arms, a pair of diverging auxiliary headlights entirely independent and separate from the main lights being located near the latter, sleeves of insulation material surrounding said arms, clamps on said sleeves, spring contacts carried by the latter and extending at right angles thereto being engageable with said rod according to the direction of turn of the vehicle, and electric circuits for said device including said contacts and said rod.

In testimony whereof I have hereunto set my hand.

GERALD H. HARVEY.